United States Patent
Callahan, Jr.

(10) Patent No.: US 7,057,843 B2
(45) Date of Patent: Jun. 6, 2006

(54) DISK DRIVE CONTROL CIRCUIT AND METHOD

(75) Inventor: Michael J. Callahan, Jr., Austin, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 173 days.

(21) Appl. No.: 10/447,913

(22) Filed: May 28, 2003

(65) Prior Publication Data

US 2004/0240100 A1 Dec. 2, 2004

(51) Int. Cl.
*G11B 5/596* (2006.01)

(52) U.S. Cl. ..................... 360/77.02; 360/75

(58) Field of Classification Search .................. 360/75, 360/77.01, 77.04, 77.06, 78.01, 78.04, 78.09, 360/78.07, 77.02; 369/44.25–44.28, 44.32–44.35, 369/50, 54, 32, 94; 710/69; 341/140, 144, 341/118, 120, 153; 318/560–696
See application file for complete search history.

(56) References Cited

U.S. PATENT DOCUMENTS

| | | | | |
|---|---|---|---|---|
| 5,072,318 A | * | 12/1991 | Yu | 360/77.02 |
| 5,774,299 A | * | 6/1998 | Baum et al. | 360/77.08 |
| 6,054,828 A | * | 4/2000 | Hill | 318/560 |
| 6,489,911 B1 | * | 12/2002 | O'Dwyer | 341/144 |
| 6,580,579 B1 | * | 6/2003 | Hsin et al. | 360/77.02 |
| 6,734,748 B1 | * | 5/2004 | Livezey | 331/158 |

* cited by examiner

*Primary Examiner*—David Hudspeth
*Assistant Examiner*—Jason Olson
(74) *Attorney, Agent, or Firm*—Lisa K. Jorgenson; Bryan A. Santarelli

(57) ABSTRACT

A servo control circuit provides seamless transition between seek and track modes while enabling both rapid seek mode operation and accurate tracking. The control circuit includes an analog-to-digital converter having a non-linear characteristic. The non-linear characteristic provides disproportionately large control voltages to derive speed and settling in the seek mode and essentially linear control voltages in the track mode to provide low noise and accurate tracking operation.

19 Claims, 3 Drawing Sheets

DISK DRIVE CONTROL CIRCUIT AND METHOD

TECHNICAL FIELD

The present invention relates, in general, to tracking control systems that may be used in controlling the position of an actuator and a read/write head of a computer mass storage device, such as a disk drive. More particularly, the present invention relates to circuitry and methods for increasing the dynamic range of a signal used in the tracking system to control the read/write head actuator of the disk drive.

BACKGROUND

Most computer systems typically include one or more disk drives for storing and retrieving data. In general, they include a randomly accessible rotating storage medium (e.g., disk platters) on which data is encoded. Typically, most disk drives will have several disks that are spanned by an equivalent number of read-write heads that are grouped together and move as a single unit.

The read/write head is mounted on an actuator arm that is attached to a voice coil motor (VCM) capable of moving the read/write head assembly across the disk surface at a high speed to the desired data track. Controlled by the track control or servo system, the voice coil motor will "seek" to the selected track and when the head reaches the selected track, the control system performs a "track following" function that positions and maintains the read/write head over a centerline of the selected track.

The seek and track following functions impose different constraints on the servo or track control system. During a seek operation, the actuator must move as fast as possible to minimize the time required to get the read/write head to the approximate location where the desired track lies. Thus, velocity, trajectory and arrival characteristics of the actuator are the determining control factors for this function. During the track following function, on the other hand, it is the accuracy with which the read/write head can be made to follow the centerline of the data track that is important.

FIG. 1 is a block diagram illustrating a typical track control system used in a disk drive to position an actuator/head over the desired data track. As shown, the track control system 100 includes a servo controller 110, a power amplifier 128, a position demodulator 130, and a tracking actuator 132. The servo controller 110 includes a processor and a compensator circuit or code 112 that generates a 12-bit command word in response to a request from the processor. The command word is 12 bits in this example but could be other widths. The 12-bit command word is sent to a digital-to-analog converter 120. The digital-to-analog converter 120 converts the command to its analog equivalent or control voltage Vc, and transmits it to the power amplifier 128. The magnitude of the voltage supplied to the power amplifier 128 determines whether the actuator will perform a "seek" or a "track-follow." This is due to the fact that the voltage required to initially accelerate or move the actuator to the appropriate data track is greater than the voltage required to keep the actuator over the centerline of the data track. Once received, the power amplifier 128 amplifies the voltage Vc and generates a proportional current output Im that is transmitted to the tracking actuator 132. The proportional current output Im therefore causes a proportional acceleration or movement of the actuator.

FIG. 1 also shows the feedback mechanism used to adjust and maintain the position of the read/write head over the data track. Control information embedded in the data provides inter-track positioning information so that a head positioning error, indicative of the difference between the estimated head position and the desired head position is sent from tracking actuator 132 to the position demodulator 130. The position demodulator 132 extracts both a positioning error voltage $V_p$ at 124 and a track number $N_p$ at 126 from the head positioning error. The positioning error $V_p$ 124 is converted into digital data by the analog-to digital-converter 122. Once converted, the positioning error $V_p$ and the data track number $N_p$ are processed by the appropriate scaling gains 116, 118 and summed together at 114 and forwarded to the compensator/processor circuit 112. This scaling and summing is typically done in the compensator code by the processor. FIG. 1 shows how the scaling and summing functions would be performed within a dotted line 113 to the compensator/processor circuit 112. In response to the head position error, compensator/processor circuit 112 adjusts the control voltage to either move the actuator to another data track or adjust the read/write head of the proper position over the centerline of the desired data track.

In response to high consumer demand for higher performing hard drives, drive manufacturers have been building disk drives with an increased number of tracks which are laid-out with an increased level of density. Unfortunately for designers of tracking control systems, this places an increased demand for speed during seek operations as well as more precise track following operations. As a result, the ability of a control system to efficiently move the read/write head to the appropriate track and maintain the read/write head over the centerline of the data track is becoming more difficult.

One approach that may be taken to improve performance is to increase the dynamic range of the control voltage Vc produced by the digital-to-analog converter. Several conventional approaches have been attempted to increase the dynamic range. One technique implements a digital-to-analog converter that is able to accommodate a processor command with a greater number of control bits. By doing this, the range or swing of the control voltage is increased while minimizing the errors normally found in signals generated by digital-to-analog converters used in this environment. The problem with this approach is that it does not overcome the system noise problems inherent with generating control voltages with greater dynamic range. In addition, the die size of the digital-to-analog converter typically doubles for every bit added to the command word, thus, increasing the size and the cost of such a component.

Another conventional technique to increase the dynamic range of the control voltage Vc generated by the digital-to-analog converter, an attenuator and an associated reference voltage controls the input of the digital-to-analog converter. Depending on the desired positioning function (i.e., seek or track-follow), the digital-to-analog converter will receive either a high or low level reference signal from the attenuator. In this technique therefore, the voltage reference that sets the signal swing is modified by the attenuator. Thus, the digital-to-analog converter will produce the appropriate range of swing of the control voltage Vc. This implementation does allow designers to reduce the die area of the tracking control system, but also has the downside of increasing digital-to-analog conversion.

In another technique for increasing the dynamic range of the control signal Vc, the reference voltage is supplied directly to the digital to analog converter. This keeps dynamic range or swing of the control voltage Vc constant.

To modify the constant Vc, a variable gain amplifier is implemented to shift between the seek mode and the track-follow mode. Unfortunately, this technique also fails to address the problem of noise pickup or offsets.

In further attempts to increase the dynamic range of the control voltage Vc, designers may integrate additional components, such as attenuators and switches, directly on the printed circuit board (PCB) that is also configured to receive the servo controller in the form of an integrated circuit (IC) chip. Some of these external components will therefore include active devices, such as field effect transistors (FETs) or FET switch ICs. As is well known, when active devices are integrated directly onto the PCB, an added level of cost and complexity is introduced into the design. More specifically, this external integrated of active components can have the unfortunate downside of increasing the cost of the entire tracking control system because the PCB components are known to significantly add to the cost of an IC solution, and increased engineering design is typically needed to ensure that the IC chip properly interfaces with the PCB components.

In view of the foregoing, there is a need for circuitry and methods that enable a wide dynamic range control signal from the digital-to-analog converter within a disk drive tracking control system. There is also a need for circuitry and methods that enable the increase in dynamic range without increasing the die size of the circuitry and without requiring external PCB active components. In addition, a need also exists for circuitry and methods that provide for an increased dynamic range in the generated control signal without increasing the control signal's susceptibility to noise pickup or offsets.

SUMMARY

The present invention provides a disk drive control circuit which provides seamless transition between seek and track modes while enabling both rapid seek mode operation and accurate tracking. The control circuit includes an analog-to-digital converter having a non-linear characteristic. The non-linear characteristic provides disproportionately large compensation voltages to derive speed and settling in the seek mode and essentially linear control voltages in the track mode to provide low noise and accurate tracking operation.

The invention further provides a control circuit that controls disk drive tracking position. The control circuit includes a digital arithmetic circuit that provides a compensation digital signal representing a difference between a desired tracking position and an actual tracking position, and a digital-to-analog converter coupled to the digital arithmetic circuit that converts the compensation digital signal to a compensation analog signal. The digital-to-analog converter has a non-linear characteristic such that the ratio of the compensation analog signal to the compensation digital signal increases for increasing amplitude compensation digital signals within an elevated compensation digital signal range. The compensation analog signal causes a change in the disk drive tracking position, towards the desired tracking position.

The digital-to-analog converter also preferably has a linear characteristic in a range below the elevated compensation digital signal range.

In one embodiment, the actual tracking position may be represented by a track number digital signal and a tracking error digital signal. The control circuit may further include an analog-to-digital converter that converts a tracking error analog signal to the tracking error digital signal.

The digital arithmetic circuit may comprise a subtractor or a digital summer arranged for subtraction.

In accordance with another embodiment, the actual tracking position may be represented by a track number digital signal, the compensation analog signal may be an intermediate compensation analog signal, and the control circuit may include an analog subtractor that subtracts an analog tracking error signal from the intermediate compensation analog signal to provide a final compensation analog signal that causes a change in the disk drive tracking position. The analog subtractor may comprise an analog summer configured for subtraction.

The invention further provides a control circuit for controlling disk drive tracking position comprising computing means responsive to at least one digital signal representing an actual tracking position for providing a digital compensation signal representing the difference between the at least one digital signal and a desired tracking position digital signal representing a desired tracking position. The control circuit further comprises digital-to-analog conversion means for converting the digital compensation signal to an analog compensation signal. The digital-to-analog conversion means has a non-linear characteristic at least in an elevated input signal range to provide a disproportionately greater analog compensation signal for digital compensation signals within the elevated input signal range. The analog compensation signal causes a change in the disk tracking position towards the desired tracking position.

The invention still further provides a method of providing a compensation signal for use in controlling disk drive tracking position. The method includes the steps of providing, responsive to at least one digital signal representing an actual tracking position, a digital compensation signal representing the difference between the at least one digital signal and a digital signal representing a desired tracking position, and converting the digital compensation signal to an analog compensation signal. The conversion is made with a non-linear conversion characteristic in at least an elevated input signal range to provide an analog compensation signal with a disproportionately large magnitude for digital compensation signals within the elevated input signal range.

The invention still further provides a control circuit comprising a first arithmetic circuit that provides a first compensation signal based upon a difference between a desired track and an actual track and a second arithmetic circuit that provides a final compensation signal based upon a difference between the first compensation signal and a tracking error.

DETAILED DESCRIPTION

Figure 1:
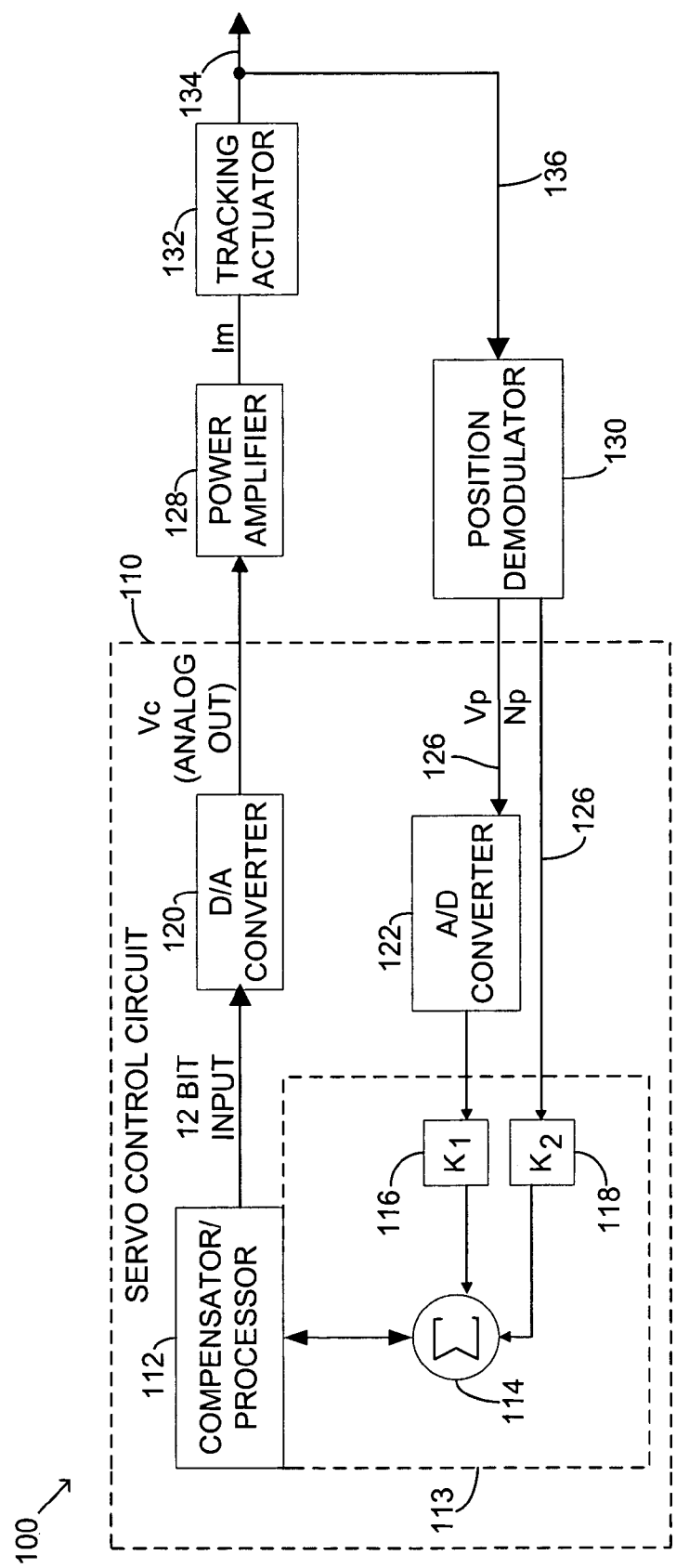
FIG. 1 is a block diagram of a prior art disk drive control system.
Figure 2:
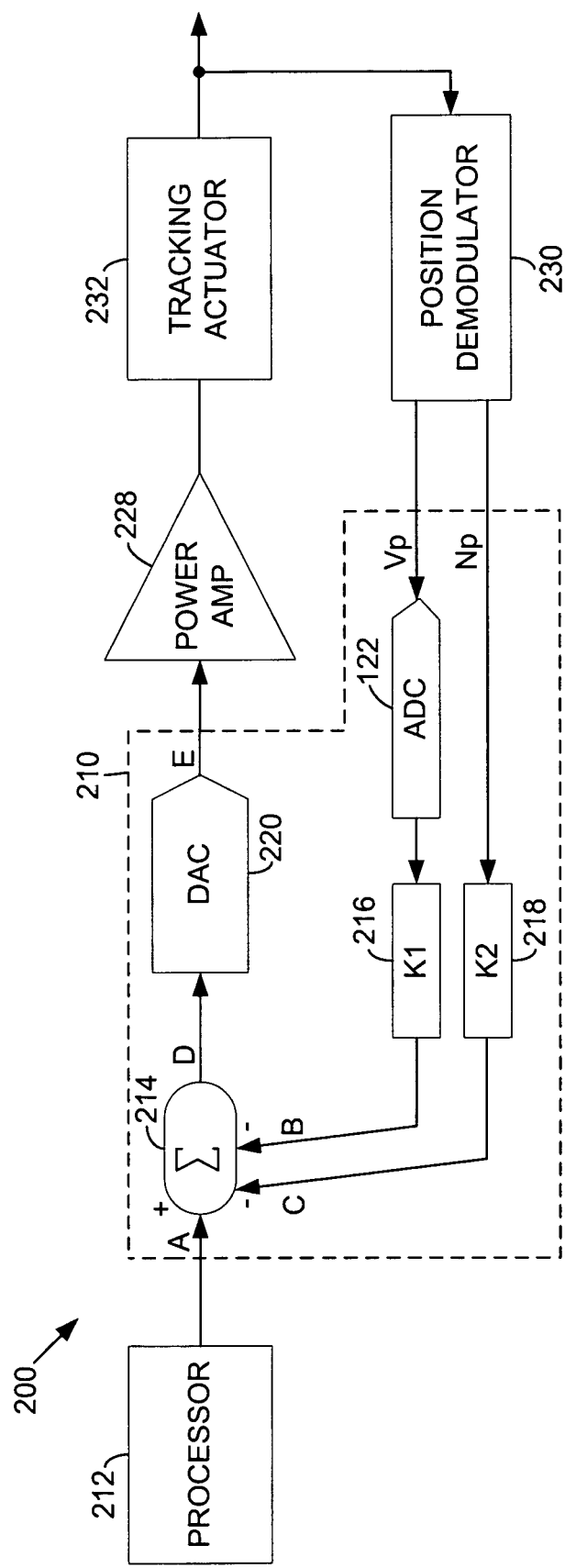
FIG. 2 is a block diagram of a disk drive control system including a disk drive control circuit embodying the present invention.

Referring now to FIG. 2, it illustrates a servo control system 200 including a servo control circuit 210 embodying the present invention. The system 200 generally includes a processor 212, the servo control circuit 210, a power amplifier 228, a tracking actuator 232, and a position demodulator 230. The servo control circuit 210 includes a digital arithmetic circuit 214, a digital-to-analog converter 220, an analog-to-digital converter 122, and scaling factors 216 and 218.

As will be seen subsequently, the digital-to-analog converter 220 is a non-linear digital-to-analog converter of the type well known in the art. Such digital-to-analog converters have been used to advantage, for example, in the telecommunications field where, for example, T1 systems use an 8-bit word which has a dynamic range that could only be obtained with a 12-bit system if a linear digital-to-analog converter were to be used. Non-linear digital-to-analog converters are known, for example, that obey an expansion algorithm wherein for low amplitude input signals the digital-to-analog converter provides a minimum gain to ensure excellent accuracy for small inputs while, in an elevated input signal amplitude region provides disproportionately large and increasing gain to increase dynamic range. In the elevated input signal region, the digital-to-analog converter may have a gain characteristic which is essentially exponential.

The processor 212 provides a digital output to the servo control circuit 210 representing the desired tracking position of, for example, a read/write head of a disk drive system. The servo control circuit 210 also receives from the position demodulator 230 information of the actual tracking position including a digital word $N_p$ representing the actual track and an analog signal $V_p$ representing the tracking error. The actual track position digital word $N_p$ is scaled by the scaling factor 218 and conveyed to the digital arithmetic circuit 214. The analog voltage $V_p$ representing the tracking error is converted to digital format by the analog-to-digital converter 122. The digital tracking error is then scaled by scaling factor 216 and conveyed to the digital arithmetic circuit 214.

The digital arithmetic circuit 214 in accordance with this embodiment comprises a digital summer configured as a subtractor. The digital arithmetic circuit 214 therefore determines the difference between the desired tracking position provided by the processor 212 and the actual tracking position to provide a digital tracking compensation signal to the digital-to-analog converter 220. The digital-to-analog converter 220 converts the digital compensation signal to an analog compensation signal which is conveyed to the power amplifier 228. The power amplifier 228 then drives the tracking actuator 232 to change the current tracking position towards the desired tracking position.

As previously mentioned, the digital-to-analog converter 220 has a non-linear characteristic. The actual track location $N_p$ is the source of the largest portion of the tracking error. The analog signal $V_p$ represents a small error resulting from minor tracking variations during the tracking mode.

When a new track is desired, the processor 212 provides a digital output representing the new desired track. The difference between the desired track and the actual track $N_p$ will be great enough to allow a large digital compensation signal from the digital arithmetic circuit 214. The elevated digital output of the digital arithmetic circuit 214 will be large enough to be within the elevated input range of the non-linear digital-to-analog converter 220. This causes the analog-to-digital converter 220 to provide a disproportionately large output analog compensation signal to the power amplifier 228 causing significant current flow in the actuator 232 to rapidly accelerate the read/write head towards the desired track. At this point, the system is in the seek mode.

As the desired track is approached, the difference between the desired track and the actual track gets smaller resulting in an output of the digital-to-analog converter 220 which decreases through the exponential characteristic of the digital-to-analog converter to the lower gain essentially linear region of the digital-to-analog converter. When the desired track is reached, the system 200 smoothly transitions into the tracking mode wherein the output of the digital arithmetic circuit 214 is essentially solely representative of the rather small amplitude tracking error represented by the analog voltage $V_p$. The transition between the track mode and the seek mode is thus automatically and smoothly accomplished as the input to the digital-to-analog converter 210 gets smaller. During the tracking mode, small changes in the track location results in small digital compensation signals from the arithmetic logic circuit 214 such that the digital-to-analog converter 220 operates with minimum gain, thereby allowing small track errors to be kept small. This is possible because the digital-to-analog converter has very fine resolution (small LSB's) in this mode. As can thus be seen, the servo control system 200 of FIG. 2 provides a smooth transition between the seek mode and the tracking mode. While providing this smooth transition, the servo control circuit 210 exhibits a wide dynamic range due to the non-linearity of the digital-to-analog converter 220. This improved function is obtainable without increasing the number of components required. Hence, an integrated circuit containing the circuit 210 need not be larger in surface area than prior art circuits.

Figure 3:
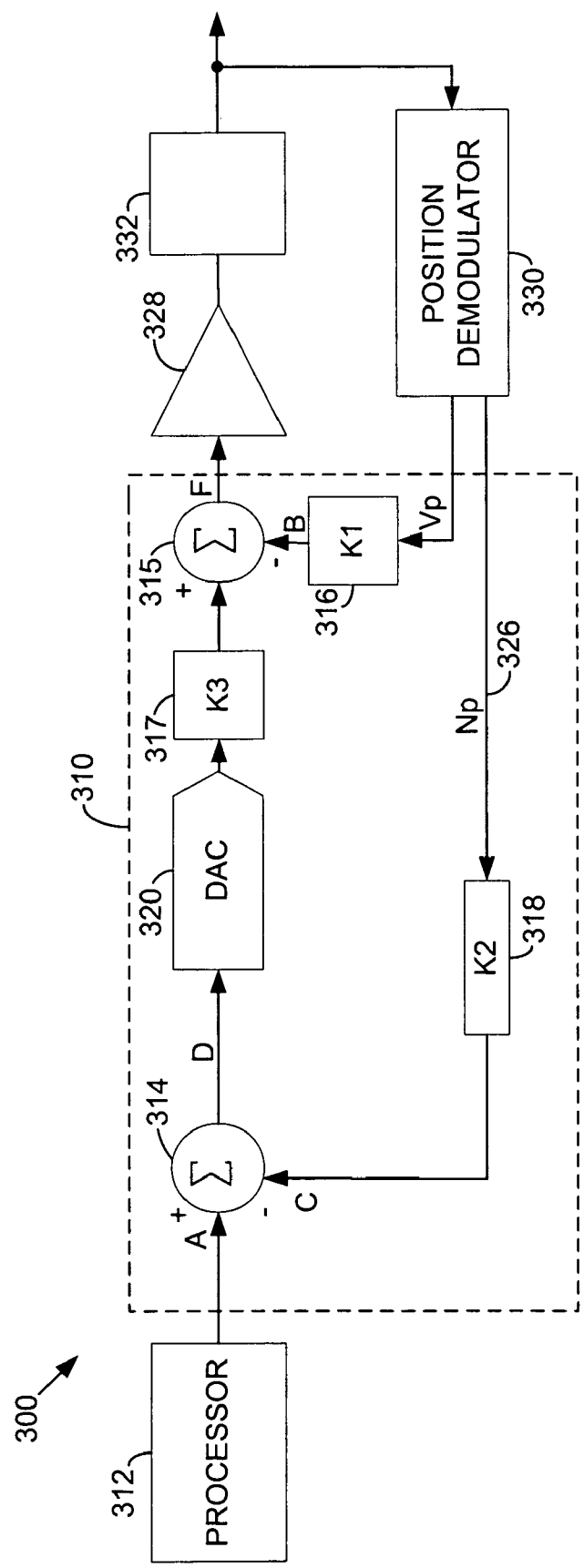
FIG. 3 is a block diagram of another disk drive control system including another disk drive control system embodying the present invention.

Referring now to FIG. 3, it illustrates another servo control system 300 embodying the present invention. The servo control system 300 includes a processor 312, a servo control circuit 310, a power amplifier 328, a track actuator 332, and a position demodulator 330. The servo control circuit includes a digital arithmetic circuit 314, a digital-to-analog converter 320, a second digital arithmetic circuit 315, and scaling factors 316 and 318.

The processor 312 provides a digital output representing a desired track position. It is conveyed to the digital arithmetic circuit 314 which, in accordance with this embodiment, is a digital summer configured as a digital subtractor. The digital arithmetic circuit 314 receives another input from the position demodulator 330 which is a digital representation of the actual track being read $N_p$. The actual track being read is factored by the scaling factor 318. The result is a first compensation signal representing the difference between the desired track and the actual track in digital format. It is applied to the digital-to-analog converter 320 which in turn provides at its output an intermediate analog compensation signal. The first analog compensation signal is scaled by a scaling factor 317 and inputted to an analog arithmetic circuit 315. The analog arithmetic circuit 315, in accordance with this embodiment, is a summer configured as a subtractor. Another input to the analog arithmetic circuit 315 is a scaled tracking error from the position demodulator 330. The tracking error analog voltage Vt provided by the position demodulator 330 is scaled by the scaling factor 316. It is then inputted to the analog arithmetic circuit 315 so that the output of the circuit 315 is a final compensation signal.

The final compensation signal is conveyed to the power amplifier 328 to provide a compensating current to the tracking actuator 332.

The digital-to-analog converter 320, in accordance with this embodiment, may be either linear or non-linear. If the digital-to-analog converter 320 is a linear digital-to-analog converter, it preferably has a steep characteristic for providing relatively large outputs. The output of the digital arithmetic circuit 314 becomes zero when the actual track being read is the desired track. This causes the output of the digital-to-analog converter 320 to be zero and hence, the final compensation signal at the output of the analog arithmetic circuit 315 is representative of only the tracking error.

It may thus be seen that the servo controlled circuit 310 of FIG. 3 consists of two negative feedback loops, each trying to minimize the tracking error. The first loop is digital, which operates on the desired track and actual track. The second loop is analog, which operates with high precision during the tracking mode.

In accordance with this embodiment, the digital to analog converter 320 may be a non-linear digital-to-analog converter. If the digital-to-analog converter 320 is non-linear, then its transfer characteristics will also affect the gain in the seek mode.

From the foregoing, it can be seen that the servo control circuit 300 of FIG. 3 provides a smooth transition from seek mode to tracking mode. The transition occurs when the output of the digital-to-analog converter 320 reaches zero at which point the tracking error smoothly takes over control of the tracking actuator. Hence, the seek mode may be performed with speed while the tracking mode may be performed with accuracy and with low noise.

In addition, the embodiment of FIG. 3 does not increase the number of components required to provide the servo control function. Hence, the circuitry may be readily integrated on an integrated circuit without increasing the required integrated circuit area.

From the foregoing, it will be appreciated that, although specific embodiments of the invention have been described herein for purposes of illustration, various modifications may be made without deviating from the spirit and scope of the invention.

What is claimed is:

1. A control circuit that controls disk drive tracking position comprising
  a digital arithmetic circuit that provides a compensation digital signal representing a difference between a desired tracking position and an actual tracking position; and
  a digital-to-analog converter coupled to the digital arithmetic circuit that converts the compensation digital signal to a compensation analog signal, the digital-to-analog converter having a non-linear characteristic such that the ratio of the compensation analog signal to the compensation digital signal increases for increasing amplitude compensation digital signals within an elevated compensation digital signal range, the compensation analog signal causing a change in the disk drive tracking position, towards the desired tracking position.

2. The control circuit of claim 1 wherein the digital-to-analog converter has a linear characteristic in a range below the elevated compensation digital signal range.

3. The control circuit of claim 1 wherein the actual tracking position is represented by a track number digital signal and a tracking error digital signal.

4. The control circuit of claim 3 further comprising an analog-to-digital converter that converts a tracking error analog signal to the tracking error digital signal.

5. The control circuit of claim 1 wherein the digital arithmetic circuit comprises a subtractor.

6. The control circuit of claim 1 wherein the digital arithmetic circuit comprises a digital summer.

7. The control circuit of claim 1 wherein the actual tracking position is represented by a track number digital signal, wherein the compensation analog signal is an intermediate compensation analog signal, and wherein the control circuit includes an analog subtractor that subtracts an analog tracking error signal from the intermediate compensation analog signal to provide a final compensation analog signal that causes a change in the disk drive tracking position.

8. The control circuit of claim 7 wherein the analog subtractor comprises an analog summer.

9. A control circuit for controlling disk drive tracking position comprising:
  computing means responsive to at least one digital signal representing an actual tracking position for providing a digital compensation signal representing the difference between the at least one digital signal and a desired tracking position digital signal representing a desired tracking position; and
  digital-to-analog conversion means for converting the digital compensation signal to an analog compensation signal, the digital-to-analog conversion means having a non-linear characteristic at least in an elevated input signal range for providing a disproportionately greater analog compensation signal for digital compensation signals within the elevated input signal range,
  the analog compensation signal causing a change in the disk tracking position towards the desired tracking position.

10. The control circuit of claim 9 wherein the digital-to-analog conversion means has a linear characteristic in a range below the elevated input signal range.

11. The control circuit of claim 9 wherein the computing means is responsive to the at least one digital signal representing actual track number and a second digital signal representing tracking error.

12. The control circuit of claim 11 further comprising analog-to-digital conversion means for providing the second digital signal from an analog signal representing tracking error.

13. The control circuit of claim 9 wherein the computing means is a summer.

14. The control circuit of claim 9 wherein the at least one digital signal represents an actual track number, wherein the analog compensation signal is an intermediate analog compensation signal and wherein the control circuit further comprises subtraction means for subtracting a tracking error analog signal from the intermediate analog compensation signal to provide a final analog compensation signal, the final analog compensation signal causing the change in the disk tracking position.

15. A method of providing a compensation signal for use in controlling disk drive tracking position comprising:
  providing, responsive to at least one digital signal representing an actual tracking position, a digital compensation signal representing the difference between the at least one digital signal and a digital signal representing a desired tracking position; and
  converting the digital compensation signal to an analog compensation signal, with a non-linear conversion characteristic in at least an elevated input signal range to provide an analog compensation signal with a disproportionately large magnitude for digital compensation signals within the elevated input signal range.

16. The method of claim 15 wherein the converting step further includes applying a linear conversion characteristic to the digital compensation signal for digital compensation signal below the elevated range.

17. The, method of claim 15 wherein the at least one digital signal is a first digital signal representing an actual track number and a second digital signal representing tracking error.

18. The method of claim 17 including the further step of performing analog to-digital conversion to provide the second digital signal.

19. The method of claim 15 wherein the at least one digital signal represents an actual track number, wherein the analog compensation signal is an intermediate analog compensation signal and wherein the method includes the further step of subtracting a tracking error analog signal from the intermediate analog compensation signal to provide a final analog compensation signal.

* * * * *